US012792714B2

(12) United States Patent
Kuwata et al.

(10) Patent No.: US 12,792,714 B2
(45) Date of Patent: Nov. 10, 2026

(54) CERTIFICATION SYSTEM, CERTIFICATION METHOD, AND COMPUTER READABLE RECORDING MEDIUM

(71) Applicant: Asahi Kasei Microdevices Corporation, Tokyo (JP)

(72) Inventors: Keiichiro Kuwata, Tokyo (JP); Takaaki Furuya, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 131 days.

(21) Appl. No.: 18/824,932

(22) Filed: Sep. 5, 2024

(65) Prior Publication Data

US 2025/0103696 A1 Mar. 27, 2025

(30) Foreign Application Priority Data

Sep. 25, 2023 (JP) ................................ 2023-161476

(51) Int. Cl.
*G06F 21/00* (2013.01)
*G06F 21/33* (2013.01)

(52) U.S. Cl.
CPC .................................. *G06F 21/33* (2013.01)

(58) Field of Classification Search
USPC .............................................................. 726/2
See application file for complete search history.

(56) References Cited

U.S. PATENT DOCUMENTS 10,037,689 B2 * 7/2018 Taylor ................ G01C 21/3415
10,229,549 B2 3/2019 Gester
10,984,128 B1 * 4/2021 Hoffer .................... G16B 50/30
(Continued)

FOREIGN PATENT DOCUMENTS

JP 2007122360 A 5/2007
JP 2008189261 A 8/2008
(Continued)

OTHER PUBLICATIONS

Jiang, Tao et al. Accurate Calibration for Large-Scale Tracking-Based Visual Measurement System. IEEE Transactions on Instrumentation and Measurement, vol. 70. https://ieeexplore.ieee.org/stamp/stamp.jsp?tp=&arnumber=9166523 (Year: 2020).*
(Continued)

*Primary Examiner* — Jeremiah L Avery

(57) ABSTRACT

Solution: A certification system includes: an obtainment unit which obtains a result of identification of a user performed based on user information regarding the user and obtains state information indicating a specific state of the user from a state detection apparatus which detects the specific state of the user; and a certification unit which certifies that a state of the user satisfies a predetermined condition, based on the result of the identification of the user and on the state information. The obtainment unit obtains, from a calibration unit which executes calibration of the state detection apparatus, management information for the state detection apparatus. The certification unit certifies that the state of the user satisfies the predetermined condition, based further on the management information.

20 Claims, 6 Drawing Sheets

(56) References Cited

U.S. PATENT DOCUMENTS

| | | | | |
|---|---|---|---|---|
| 12,033,296 | B2 * | 7/2024 | Scapel | G06T 11/60 |
| 12,567,082 | B2 * | 3/2026 | Cella | B25J 9/1682 |
| 2012/0265545 | A1 * | 10/2012 | Hwang | G16H 20/30<br>705/1.1 |
| 2012/0265548 | A1 * | 10/2012 | Hwang | G06Q 30/0207<br>705/2 |
| 2012/0265591 | A1 * | 10/2012 | Hwang | G06Q 30/00<br>705/14.1 |
| 2016/0210602 | A1 * | 7/2016 | Siddique | G06Q 20/12 |
| 2020/0268260 | A1 * | 8/2020 | Tran | A61B 1/000096 |
| 2020/0384464 | A1 * | 12/2020 | Kawashima | G01N 21/6428 |
| 2021/0084451 | A1 * | 3/2021 | Williams | A61B 5/165 |
| 2021/0202067 | A1 * | 7/2021 | Williams | A61B 5/0022 |
| 2022/0116736 | A1 * | 4/2022 | Williams | G16H 50/20 |
| 2022/0197986 | A1 * | 6/2022 | Zizi | G06F 21/32 |
| 2022/0245574 | A1 * | 8/2022 | Cella | G06Q 10/087 |
| 2023/0007439 | A1 * | 1/2023 | Williams | G06Q 20/4014 |
| 2023/0098602 | A1 * | 3/2023 | Cella | G05B 13/0265<br>700/248 |
| 2023/0234537 | A1 | 7/2023 | Kramar | |
| 2024/0070627 | A1 * | 2/2024 | Galterio | G06Q 20/36 |
| 2024/0221937 | A1 * | 7/2024 | Shelton, IV | G16H 50/20 |
| 2024/0416755 | A1 | 12/2024 | Schmitt | |

FOREIGN PATENT DOCUMENTS

| | | | |
|---|---|---|---|
| JP | 2018135072 | A | 8/2018 |
| JP | 7209121 | B1 | 1/2023 |

OTHER PUBLICATIONS

Avinash, Y. et al. Activity based energy model for calibrated simulation approach in retrofitting a multi use facility. 2010 Conference Proceedings IPEC. https://ieeexplore.ieee.org/stamp/stamp.jsp?tp=&arnumber=5696986 (Year: 2010).*

Specker, Andreas; Beyerer, Jurgen. Improving Attribute-Based Person Retrieval By Using A Calibrated, Weighted, And Distribution-Based Distance Metric. 2021 IEEE International Conference on Image Processing (ICIP). https://ieeexplore.ieee.org/stamp/stamp.jsp?tp=&arnumber=9506096 (Year: 2021).*

Kawaguchi, Nobuaki, "2060: A Blank Map for Creating the Future," Technical Review Company, Mar. 24, 2020, First Edition, ISBN: 978-4-297-11159-5, pp. 145-147.

Arii, Shiori, et al. A Driver Authentication Method Using Pressure Sensor Sheet by Combination of Physical Features and Active Features. Proceedings of the Multimedia, Distributed, Cooperative, and Mobile (DICOMO 2017) Symposium, Information Processing Society of Japan, Jun. 21, 2017, Information Processing Society Symposium Series, vol. 2017 No. 1, pp. 819-825.

* cited by examiner

CERTIFICATION SYSTEM, CERTIFICATION METHOD, AND COMPUTER READABLE RECORDING MEDIUM

The contents of the following patent application(s) are incorporated herein by reference: NO. 2023-161476 filed in JP on Sep. 25, 2023

BACKGROUND

1. Technical Field

The present invention relates to a certification system, a certification method, and a computer readable recording medium.

2. Related Art

Patent Document 1 describes that the management system unit is configured to store results of the matching of authorization data and authorization information and results of the analysis of the breath sample and to link these results to the personal identification information.

PRIOR ART DOCUMENT

Patent Document

Patent Document 1: U.S. Pat. No. 10,229,549
Patent Document 2: Japanese Patent No. 7209121

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solution of the invention.

Figure 1:
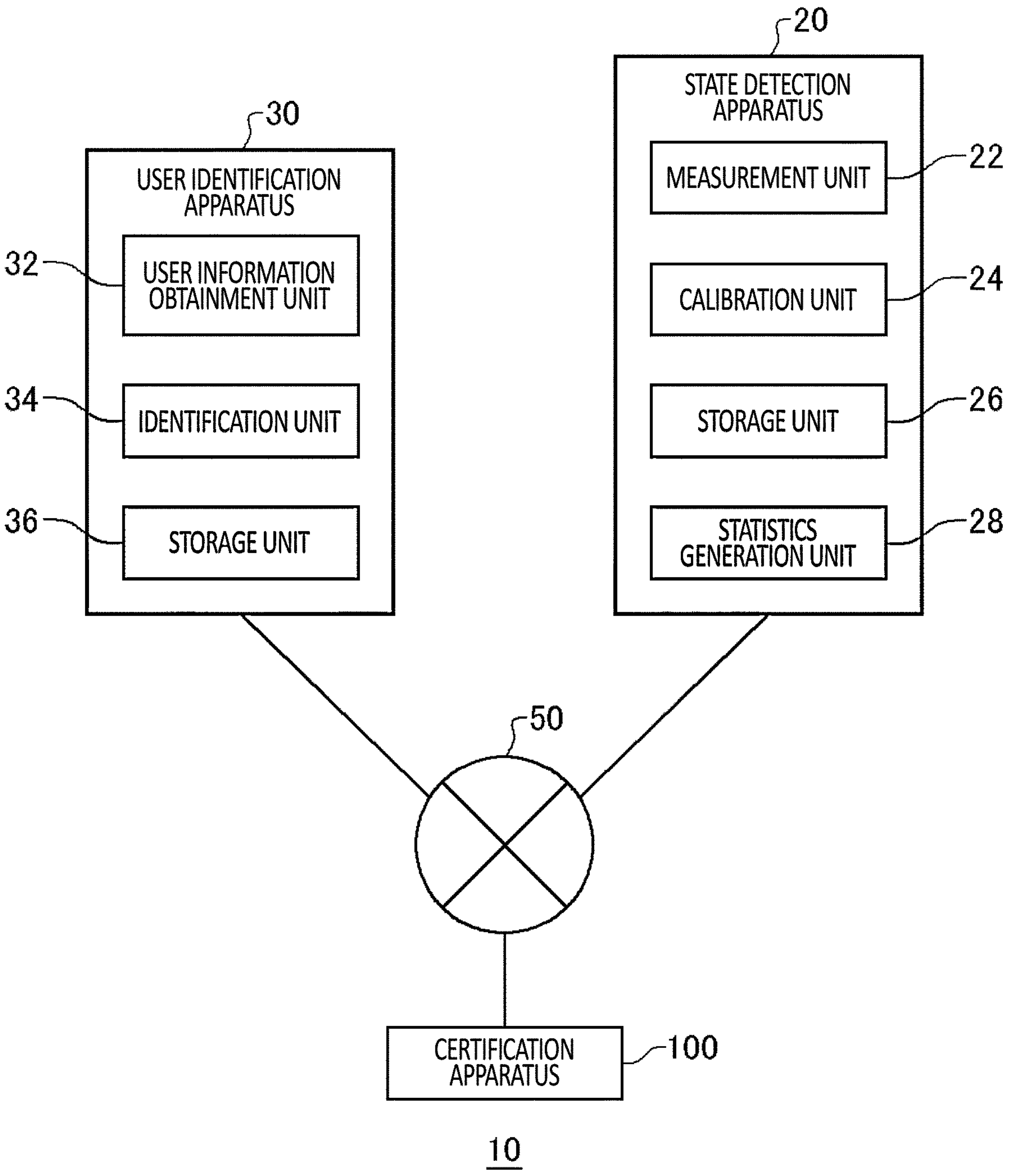
FIG. 1 shows one example of a functional block of a certification system according to the present embodiment.

FIG. 1 shows one example of a functional block of a certification system 10 according to the present embodiment. The certification system 10 includes a state detection apparatus 20, a user identification apparatus 30, and a certification apparatus 100. The state detection apparatus 20, the user identification apparatus 30, and the certification apparatus 100 are connected to each other so as to be able to communicate with each other via a network 50 such as an Internet or an intranet. The state detection apparatus 20, the user identification apparatus 30, and the certification apparatus 100 may be configured as a single apparatus. Two of the state detection apparatus 20, the user identification apparatus 30, and the certification apparatus 100 may be configured as a single apparatus. That is, the state detection apparatus 20 and the user identification apparatus 30 may be configured as a single apparatus. The user identification apparatus 30 and the certification apparatus 100 may be configured as a single apparatus. The state detection apparatus 20 and the user identification apparatus 30 may be configured as a single apparatus. The state detection apparatus 20 and the certification apparatus 100 may be configured as a single apparatus.

The state detection apparatus 20 detects a specific state of a user. The user identification apparatus 30 identifies the user based on user information regarding the user. The user identification apparatus 30 identifies the user based on at least one of biometric authentication, ID authentication, or password authentication. The certification apparatus 100 certifies that a state of the user satisfies a predetermined condition, based on state information indicating the specific state of the user that is provided from the state detection apparatus 20 and on a result of identification of the user that is provided from the user identification apparatus 30, and issues a certificate of permission. The certificate of permission certifies that the state information indicates a state of a specific user without any alteration. The certificate of permission certifies that the state information does not indicate the state of the specific user that has been fraudulently obtained. Utilizing this kind of certificate of permission allows for confirmation of credibility of information indicating the specific state of the user. Utilizing this kind of certificate of permission allows for accurate judgement as to whether the user is permitted to operate a specific apparatus according to the state of the user.

The state detection apparatus 20 may have a statistics generation unit 28 which statistically processes the state information. The certification apparatus 100 may certify that the state of the user satisfies the predetermined condition, based on the state information indicating the specific state of the user that is provided from the state detection apparatus 20 and statistically processed by the statistics generation unit 28 and on the result of the identification of the user that is provided from the user identification apparatus 30, and issues the certificate of permission. Statistical processing is generating at least one of an average, a maximum, a minimum, variance, a moment, or a histogram of measurement values.

Figure 2:
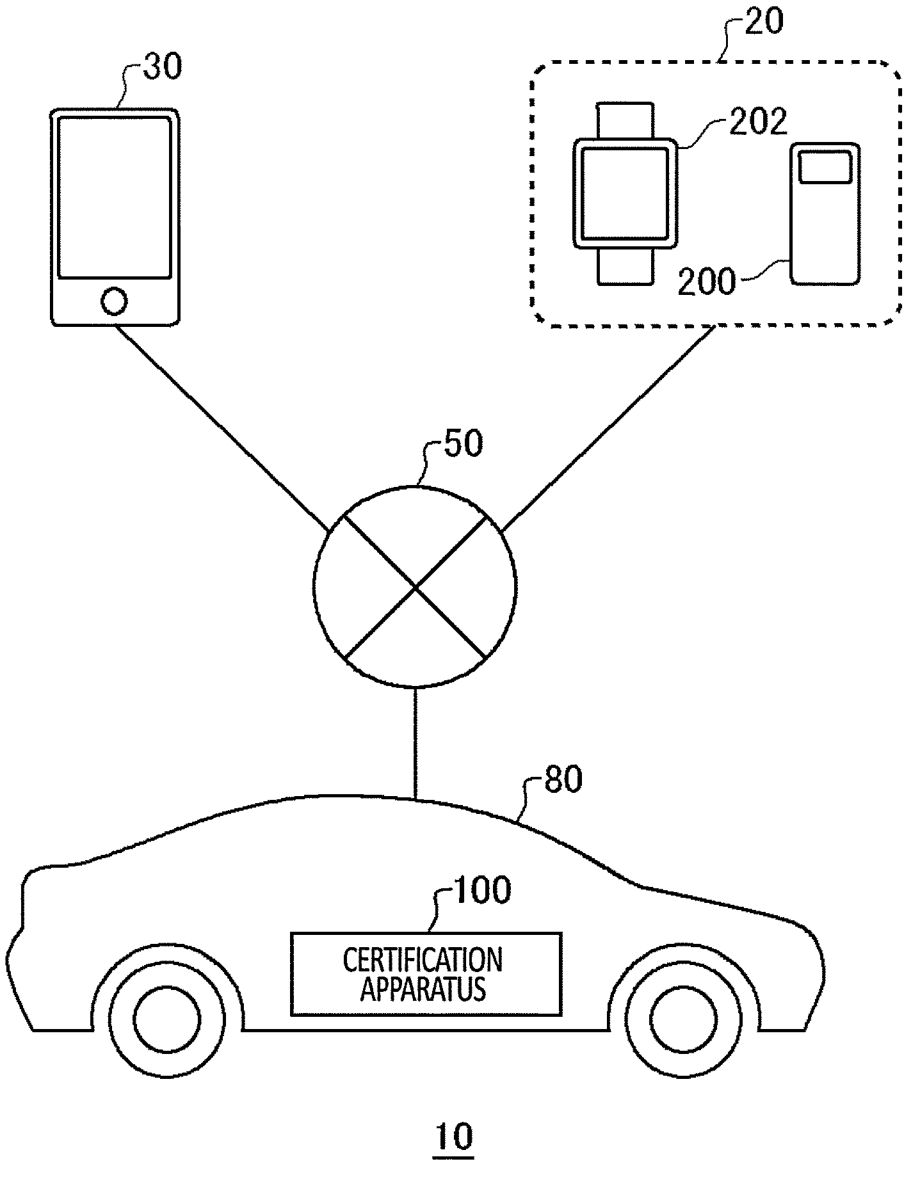
FIG. 2 shows a more specific configuration example of a certification system.

FIG. 2 shows a more specific configuration example of a certification system 10. A certification apparatus 100 is provided in, for example, a moving body 80 such as an automobile. The moving body 80 is a concept including a vehicle moving on the ground, an air vehicle moving in the air, a ship moving on the water, and the like. The air vehicle moving in the air is a concept including a flying machine, an airship, a helicopter, and the like moving in the air.

If the certification apparatus 100 is provided in an automobile, an Electronic Control Unit (ECU) which controls the automobile may function as the certification apparatus 100. The ECU may be configured to include a so-called microcomputer composed of a CPU, a ROM, a RAM, an input/output interface, and the like. The ECU performs signal processing in accordance with a program pre-stored in the ROM while utilizing a temporary storage function of the RAM.

A state detection apparatus 20 detects at least one of a state regarding a physical condition of a user, a state regarding an activity of the user, a state regarding work of the user, or a state regarding a capacity of the user. The state regarding the physical condition of the user may include at least one of a breath alcohol concentration, a blood alcohol concentration, a body temperature, a heartbeat, a pulse beat, a respiratory rate, a blood pressure, a blood glucose level, coughing, a voice, an eye movement, myoelectricity, a facial expression, staggering, or a stress state. The state regarding the activity of the user may include at least one of meal hours, meal contents, an exercise record, sleeping hours, a medication history, a hospital visit history, or a treatment history. The state regarding the work of the user may include at least one of working hours, overtime working hours, an amount of time elapsed since an end of last work, or the number of consecutive working days. The state regarding the capacity of the user may include at least one of a cognitive capacity or an exercise capacity check test.

The state detection apparatus 20 may be an alcohol detector 200 which detects the breath alcohol concentration. If the state detection apparatus 20 is the alcohol detector 200 which detects the breath alcohol concentration, it can measure an alcohol concentration in breath with high accuracy, so the alcohol detector 200 is preferably of an optical type. The state detection apparatus 20 may be, for example, a wearable terminal 202 which detects at least one of a blood alcohol concentration, a body temperature, a heartbeat (RF measurement), a pulse beat, a respiratory rate, a blood pressure, a blood glucose level, coughing, a voice, an eye movement, myoelectricity, a facial expression, staggering, or a stress state. The state detection apparatus 20 may include the alcohol detector 200 and the wearable terminal 202. In addition to the alcohol detector 200 and the wearable terminal 202, the state detection apparatus 20 may include another apparatus such as a sensor that detects a specific state of the user. The state detection apparatus 20 may be a sensor that is provided in the interior of the moving body 80 and detects the specific state of the user.

If the state detection apparatus 20 is the alcohol detector 200 that detects the breath alcohol concentration and has a statistics generation unit 28 which statistically processes a result of measurement by the alcohol detector 200, when an average of results of measuring concentrations of alcohol contained in breath of the user is below a reference value (for example, 0.15 mg/L), the certification apparatus 100 may certify that the user is not in a drunk state.

If the state detection apparatus 20 is a thermometer that detects the body temperature of the user and has a statistics generation unit 28 which statistically processes a result of measurement by the thermometer, when the result of the measurement by the thermometer does not significantly deviate from a reference value that is estimated from an average or variance of results of the measurement performed over a certain period of time in the past, or when the result of the measurement is below a specific value (for example, 37.5 degrees C.), the certification apparatus 100 may certify that the user has a normal body temperature.

The state detection apparatus 20 may be a user activity management apparatus that manages the state regarding the activity of the user. The user activity management apparatus may be a mobile terminal such as a smartphone having at least one application built-in that manages at least one of meal hours, meal contents, an exercise record (the number of steps, or calories burned), sleeping hours, a medication history, a hospital visit history, or a treatment history.

If the state detection apparatus 20 is the user activity management apparatus that manages the state regarding the activity of the user, when the most recent sleeping hours of the user is equal to or longer than a certain amount of time (for example, five hours), the certification apparatus 100 may certify that the user is able to work.

The state detection apparatus 20 may be an attendance management apparatus that manages a state regarding the work or school work of the user. The state detection apparatus 20 may be a user capacity management apparatus that manages the state regarding the capacity of the user. The user capacity management apparatus may be a mobile terminal such as a smartphone that saves the cognitive capacity, a skill, and a result of the exercise capacity check test.

If the state detection apparatus 20 is the attendance management apparatus that manages the state regarding the work or the school work of the user, when a certain amount of time (for example, nine hours) or longer has elapsed since the user last finished work (finished study), when total working hours (studying hours) for one month is equal to or shorter than a certain amount of time (for example, 284 hours), when the user is in a predefined area at a predefined time, or when consecutive working hours (consecutive studying hours) is equal to or shorter than a certain amount of time (for example, four hours), the certification apparatus 100 may certify that the user is able to work (able to study).

If the state detection apparatus 20 is a sensor that detects the breath alcohol concentration or the like, the state detection apparatus 20 may include a measurement unit 22, a calibration unit 24, and a storage unit 26. The measurement unit 22 may measure a physical amount regarding the user. The physical amount may be the state regarding the physical condition of the user, such as the breath alcohol concentration. In addition, the physical amount may be a body temperature, or may be cardiopulmonary information such as a heart sound or a heart rate.

The calibration unit 24 executes calibration of the state detection apparatus 20. If the state detection apparatus 20 is a sensor, a characteristic of the sensor may change with time.

The calibration unit 24 may execute the calibration based on an indicator of the specific state such as the breath alcohol concentration measured by the measurement unit 22 and on a reference indicator measured in advance when the user to be measured is in the specific state. A calibration unit 106 may correct a coefficient for calculating measurement such that the measured indicator matches the reference indicator. The state detection apparatus 20 may correct the coefficient such that a minimum of an indicator calculated by itself within a predetermined period of time matches the reference indicator.

In addition, if the measurement unit 22 measures the measured breath alcohol concentration, a measurement value VM for a period of time during which the breath has not been given may be used as a zero point, to automatically perform zero-point calibration of the measurement unit 22. Specifically, the zero-point calibration is correction performed by subtracting the VM from a measurement value.

The storage unit 26 may store management information including at least one of: a calibration time at which calibration is to be executed by the calibration unit 24; whether any calibration has been executed by the calibration unit 24; a calibration date and time, a calibration method, calibrator information, or a calibration setting (whether automatic calibration is to be executed, automatic calibration interval, or the like); a correction amount or a correction formula for correcting the specific state of the user detected by the state detection apparatus 20; presence or absence of a failure of the state detection apparatus 20; a cumulative number of times that the state detection apparatus 20 has been used; an expiration date for use of the state detection apparatus 20; or a version or update of software of the state detection apparatus 20. The storage unit 26 may store management information including at least one of: a calibration time at which calibration is to be executed by the calibration unit 24;

whether any calibration has been executed by the calibration unit 24; a calibration date and time, a calibration method, calibrator information, or a calibration setting (whether automatic calibration is to be executed, automatic calibration interval, or the like); a correction amount or a correction formula for correcting the physical amount measured by the measurement unit 22; presence or absence of a failure of the measurement unit 22; a cumulative number of times that the measurement unit 22 has been used; an expiration date for use of the measurement unit 22; or a version or update of software of the measurement unit 22. The calibration method is a method of the calibration executed by the calibration unit 24. The calibration method may include environmental information (a temperature, humidity, an atmospheric pressure, and a date and time) during calibration.

A user identification apparatus 30 includes a user information obtainment unit 32, an identification unit 34, and a storage unit 36. The user information obtainment unit 32 may be an image-capturing unit that captures an image showing, for example, a face, a fingerprint, an iris, or a vein of the user, as user information regarding the user for identifying the user. The user information obtainment unit 32 may be a microphone that records the voice of the user as the user information. If the user information obtainment unit 32 obtains the voice of the user, it may instruct the user to read out different words each time the user information is obtained, in order to prevent the user from posing as a legitimate user by playing back a recorded sound.

The user information obtainment unit 32 may be a reader that reads a user ID from a card that displays or stores it. The card may be an ID card that displays or stores information for uniquely specifying the user, such as an employee identification card or a license. The user information obtainment unit 32 may be an input unit such as a touch panel or keyboard that accepts an ID and a password from the user.

The identification unit 34 identifies the user based on the user information. The storage unit 36 may store a variety of information necessary for the identification unit 34 to identify the user. The storage unit 36 stores user identification information that allows for identification of the user from among the user information. The identification unit 34 may identify the user, by comparing the user information with the user identification information to determine whether the user is a legitimate user who has been pre-certified, whether the user is permitted to perform a target processing, whether the user is permitted to operate a target apparatus, whether the user is an employee, whether the user is a registered user, or the like.

The user identification apparatus 30 may be a mobile terminal such as a smartphone having a user authentication function such as a camera function, face authentication, or a fingerprint authentication function. The user identification apparatus 30 may be a camera, a microphone, or the like provided in the interior of the moving body 80.

Figure 3:
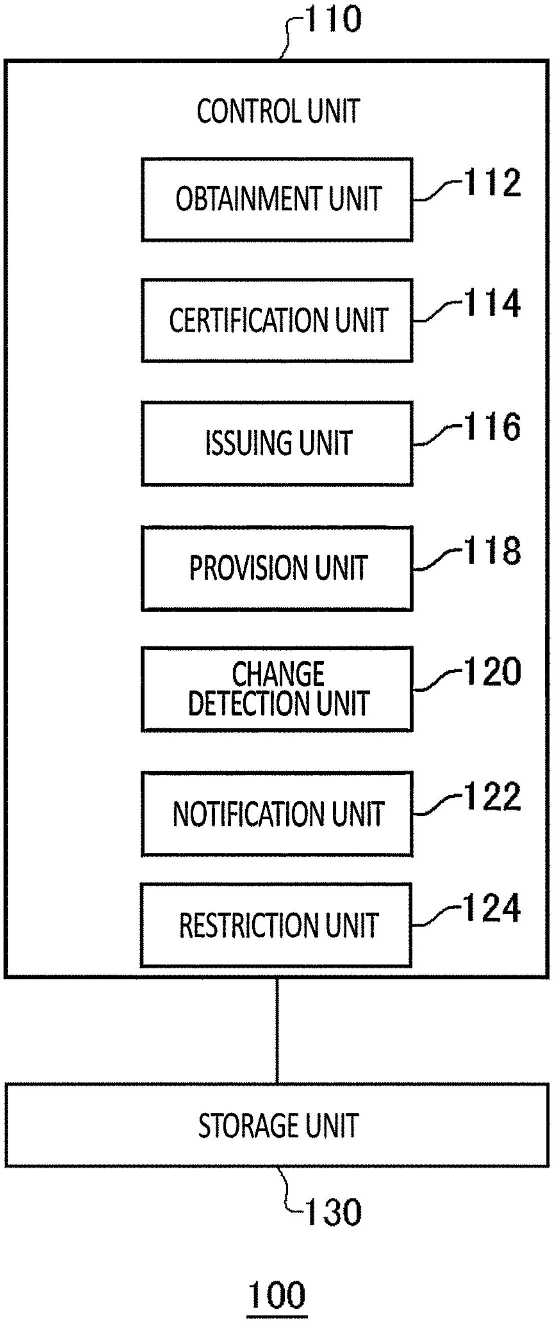
FIG. 3 is one example of a functional block of a certification apparatus.

FIG. 3 is one example of a functional block of a certification apparatus 100. The certification apparatus 100 includes a control unit 110 and a storage unit 130.

The control unit 110 may be constituted by a microprocessor such as a CPU or an MPU, a microcontroller such as an MCU, or the like. The control unit 110 has an obtainment unit 112, a certification unit 114, an issuing unit 116, a provision unit 118, a change detection unit 120, a notification unit 122, and a restriction unit 124.

The obtainment unit 112 obtains a result of identification of a user from a user identification apparatus 30, and obtains state information indicating a specific state of the user from a state detection apparatus 20. The obtainment unit 112 may obtain, from the state detection apparatus 20, the result of the identification of the user obtained by the state detection apparatus 20 from the user identification apparatus 30, together with the state information indicating the specific state of the user. The obtainment unit 112 may obtain, from the user identification apparatus 30, the state information indicating the specific state of the user obtained by the user identification apparatus 30 from the state detection apparatus 20, together with the result of the identification of the user. The obtainment unit 112 also obtains common information that associates the result of the identification of the user with the state information. If the state detection apparatus 20 and the user identification apparatus 30 are constituted by the same apparatus, the obtainment unit 112 may obtain the result of the identification of the user and the state information together with apparatus information for uniquely identifying the apparatus. The obtainment unit 112 may separately obtain the result of the identification including the apparatus information and the state information including the apparatus information. If the state detection apparatus 20 and the user identification apparatus 30 are not constituted by the same apparatus, the state detection apparatus 20 and the user identification apparatus 30 may be arranged so as to be adjacent to each other at least to the extent that both identification of the user by the user identification apparatus 30 and detection of the user by the state detection apparatus 20 can be executed on the spot without the user having to move one place to another. The state detection apparatus 20 and the user identification apparatus 30 may be arranged at a distance allowing short-range communication.

The state detection apparatus 20 and the user identification apparatus 30 arranged so as to be adjacent to each other may have common information, the state detection apparatus 20 may transmit the state information including the common information to the certification apparatus 100, and the user identification apparatus 30 may transmit the result of the identification of the user including the common information to the certification apparatus 100.

The certification unit 114 certifies that a state of the user satisfies a predetermined condition, based on the result of the identification of the user and the state information. If the result of the identification of the user indicates that the user is legitimate, the state information indicates a state of the legitimate user, and the state of the user satisfies a predetermined acceptability condition, the certification unit 114 may certify that the state of the user satisfies the predetermined condition.

For example, if the result of the identification of the user indicates that the user is permitted to drive a specific automobile, the state information indicates a breath alcohol content of the specific user, and a condition is satisfied that a breath alcohol concentration of the specific user is equal to or lower than a reference value for which driving is acceptable, the certification unit 114 may certify that the state of the user satisfies the predetermined condition.

In addition, a measurement unit 22 may measure a breath $CO_2$ concentration in addition to measuring the breath alcohol concentration. A concentration of $CO_2$ contained in human breath is approximately 4%, which is higher than a $CO_2$ concentration in the atmosphere. Accordingly, the measurement unit 22 measuring the breath $CO_2$ concentration allows the certification unit 114 to estimate that a target measured by the measurement unit 22 is not a disguised gas but breath of the user.

In addition, the measurement unit 22 may measure a pressure in addition to measuring the breath alcohol concentration. The measurement unit 22 measuring the pressure allows the certification unit 114 to estimate that the user has correctly given the breath.

In addition, the certification unit 114 may use, during certification, an image or video captured by a camera that captures an image of the user. Using the image or the video captured by the camera allows for determination as to whether the user has cheated and the certification.

In addition, if a condition for the certification is considered as a certification condition, the certification unit 114 may obtain information regarding act amendment or the like through Internet or the like, and change the certification condition in response to the act amendment or the like.

The certification unit 114 may additionally certify that the state detection apparatus 20 is kept in an appropriate state. The appropriate state is, for example, a state in which the state detection apparatus 20 is regularly calibrated and maintained.

If the result of the identification of the user indicates that the user is permitted to drive a specific automobile, the state information indicates an amount of time elapsed since the specific user last finished work, and a condition is satisfied that the amount of time elapsed since the specific user last finished work is equal to or longer than a reference amount of time elapsed for which driving is acceptable, the certification unit 114 may certify that the state of the user satisfies the predetermined condition.

The certification unit 114 may certify that the state of the user satisfies the predetermined condition by determining whether at least one of moving body information, environmental information, or locational information, in addition to the state information for the user and the result of the identification of the user, satisfies a predetermined condition corresponding to a characteristic of an apparatus operated by the user.

If the state of the user does not satisfy the predetermined condition, the certification unit 114 may request the user again to provide the state information for the user and the result of the identification of the user again. Further, if the state of the user does not satisfy the predetermined condition after the repeated provision, the user, a certification body designated by a national or local government, a third-party body, an employer of the user, a manufacturer of a certification system, or a guardian to the user may be notified that the state of the user has not satisfied the predetermined condition.

If the certification unit 114 certifies that the state of the user satisfies the predetermined condition, the issuing unit 116 issues a certificate of permission indicating that it has been certified that the state of the user satisfies the predetermined condition. The certificate of permission may be an electronic certificate. The electronic certificate may be an electronic document electronically signed by an approval body and indicating that it has been certified that the state of the user satisfies the predetermined condition. The approval body may be a certification body designated by a national or local government, a third-party body, an employer of the user, a manufacturer of a certification system, or a guardian to the user, or may be a body delegated by these bodies.

The provision unit 118 provides the certificate of permission to an apparatus that the user is permitted to operate based on the certificate of permission. The provision unit 118 provides the certificate of permission to a moving body 80 that the user is permitted to drive based on the certificate of permission. The provision unit 118 may provide the certificate of permission to an ECU of the moving body 80 that the user is permitted to drive based on the certificate of permission. If the ECU of the moving body 80 functions as the certification apparatus 100, the provision unit 118 may provide the certificate of permission to a judgement unit included in the ECU of the moving body 80 and judging whether driving of the moving body 80 is to be permitted.

If the certificate of permission for the user is provided, that is, if the certificate of permission for the user is issued, the ECU of the moving body 80 may permit the user to drive the moving body 80. If the user is permitted to drive the moving body 80, the ECU of the moving body 80 may permit a drive source to start in response to an ignition switch being turned on. If the user is permitted to drive the moving body 80, the ECU of the moving body 80 may permit a door for a driver cab of the moving body 80 to be unlocked.

The change detection unit 120 detects that a user operating the apparatus has been changed. In response to the change detection unit 120 detecting that the user has been changed, the obtainment unit 112 may newly obtain the state information and the result of the identification of the user, and the certification unit 114 may certify that the state of the user satisfies the predetermined condition, based on the result of the identification that has been newly obtained and on the state information that has been newly obtained.

The change detection unit 120 may detect that a driver of the moving body 80 has been changed. The change detection unit 120 may detect that the driver of the moving body 80 has been change, based on face authentication performed based on an image captured by a camera that captures an image of the driver cab of the moving body 80. The change detection unit 120 may detect that the driver of the moving body 80 has been changed, based on a result of detection by a seating sensor provided in a seat of the driver cab of the moving body 80. The change detection unit 120 may detect that the driver of the moving body 80 has been changed, based on a result of detection by a millimeter wave detector provided in the moving body 80.

In response to the change detection unit 120 detecting that the driver of the moving body 80 has been changed, the obtainment unit 112 may newly obtain the state information from the state detection apparatus 20 and the result of the identification of the user from the user identification apparatus 30, and the certification unit 114 may certify again that the state of the user satisfies the predetermined condition, based on the result of the identification of the user that has been newly obtained and on the state information for the user that has been newly obtained.

The obtainment unit 112 may further obtain the moving body information regarding the moving body 80 from the moving body 80. The certification unit 114 may certify that the state of the user satisfies the predetermined condition, based further on the moving body information. The moving body information may be information such as a vehicle identification number for uniquely identifying the moving body 80. In addition, the moving body information may include an inspection record (inspection details, an inspection date and time, an inspector, an operation manager, a maintenance manager, things to be done after the inspection, or the like) of the moving body 80, a mileage of the moving body 80, state information for the moving body 80 (a temperature of each component constituting the moving body 80, a remaining amount of cooling water, a tension/damage level of a fan belt, engine speed, an engine oil level, a motor output, gears used, a blinking condition of a lighting system, dirt on the lighting system, and damage to the lighting system, an attachment condition of a disc wheel, a tire pressure, tire wear, a remaining amount of fuel, a remaining battery level, an amount of water condensed in an air tank, an air tank pressure, a brake fluid level, a brake pad remaining, a washer fluid level, degree of wiper wear, or the like). The certification unit 114 may determine whether the user specified by the result of the identification of the user is a user permitted to drive a specific moving body specified by the information such as the vehicle identification number.

The obtainment unit 112 may further obtain environmental information indicating a state of an environment around the user. The certification unit 114 may certify that the state of the user satisfies the predetermined condition, based further on the environmental information. The environmental information may indicate, for example, at least one of a gas concentration, a dust amount, a temperature, humidity, noise, illuminance, a vibration, an electromagnetic wave, an X-ray dose, a radiation dose, or an ozone concentration. The gas concentration may be, for example, a $CO_2$ concentration. Accuracy of the specific state of the user detected by the state detection apparatus 20 may change depending on a temperature. Therefore, the certification unit 114 may certify that the state of the user satisfies the predetermined condition, based further on whether the temperature indicated by the environmental information falls within a temperature range in which detection accuracy of the state detection apparatus 20 satisfies or exceeds a reference value.

The obtainment unit 112 may further obtain locational information indicating a location at which the user is present. The certification unit 114 certifies that the state of the user satisfies the predetermined condition, based further on the locational information. For example, an area may be limited in which a specific user is allowed to drive the moving body 80. Alternatively, the accuracy of the specific state of the user detected by the state detection apparatus 20 may change depending on a place. Therefore, the certification unit 114 may certify that the state of the user satisfies the predetermined condition, based further on whether the location indicated by the locational information is an area where the specific user is allowed to drive the moving body 80, or whether the location indicated by the locational information is an area where the accuracy of the specific state of the user detected by the state detection apparatus 20 satisfies or exceeds the reference value. In addition, the certification unit 114 may change the condition for the certification depending on the locational information. For example, in Japan, an alcohol concentration in breath of 0.15 mg/L or higher is considered as drunk-driving, but in Germany, an alcohol concentration in breath of 0.25 mg/L or higher is considered as legal violation, so the certification unit 114 may change the condition for the certification depending on the locational information.

The certification unit 114 causes the storage unit 130 to store a certification result. The certification unit 114 may cause another storage unit such as a storage unit 26 of the state detection apparatus 20 or a storage unit 36 of the user identification apparatus 30, in addition to the storage unit 130, to store the certification result as a backup.

The obtainment unit 112 may obtain, from the state detection apparatus 20, management information including at least one of: a calibration time at which calibration is to be executed by a calibration unit 24; whether any calibration has been executed by the calibration unit 24; a calibration date and time, a calibration method, calibrator information, or a calibration setting (whether automatic calibration is to be executed, automatic calibration interval, or the like); a correction amount or a correction formula for correcting the specific state of the user detected by the state detection apparatus 20; presence or absence of a failure of the state detection apparatus 20; a cumulative number of times that the state detection apparatus 20 has been used; an expiration date for use of the state detection apparatus 20; or a version or update of software of the state detection apparatus 20. The obtainment unit 112 may obtain, from the state detection apparatus 20, management information including at least one of: a calibration time at which calibration is to be executed by a calibration unit 24; whether any calibration has been executed by the calibration unit 24; a calibration date and time, a calibration method, calibrator information, or a calibration setting (whether automatic calibration is to be executed, automatic calibration interval, or the like); a correction amount or a correction formula for correcting a physical amount measured by the measurement unit 22; presence or absence of a failure of the measurement unit 22; a cumulative number of times that the measurement unit 22 has been used; an expiration date for use of the measurement unit 22; or a version or update of software of the measurement unit 22.

The certification unit 114 may certify that the state of the user satisfies the predetermined condition, based further on the management information. The state detection apparatus 20 that has not been correctly calibrated can provide less accurate state information. Therefore, the certification unit 114 may certify that the state of the user satisfies the predetermined condition, based further on whether the calibration of the state detection apparatus 20 satisfies a predetermined calibration condition, based on the management information. If the management information satisfies the predetermined calibration condition, the certification unit 114 may certify that the state of the user satisfies the predetermined condition, based on the result of the identification of the user and on the state information. For example, the management information satisfying the predetermined calibration condition may mean that the state detection apparatus 20 has been calibrated by a certified calibrator in an appropriate calibration method within one year.

If the management information does not satisfy the predetermined calibration condition, the user, a certification body designated by a national or local government, a third-party body, an employer of the user, a manufacturer of a certification system, or a guardian to the user may be notified that the management information does not satisfy the predetermined calibration condition.

If the certification unit 114 does not certify that the state of the user satisfies the predetermined condition, the notification unit 122 gives notice indicating that the user has not been certified. The notification unit 122 may notify a mobile terminal of the user, an interior display of the moving body 80, a certification body designated by a national or local government, a third-party body, an employer of the user, a manufacturer of a certification system, a guardian to the user, or the like, that the user has not been certified. A notification method may be an alarm sound, a warning light, a phone call, or an electronic means of communication (an email, social media, an SMS, or the like).

If the certification unit 114 does not certify that the state of the user satisfies the predetermined condition, the restriction unit 124 may restrict an action of the user. For example, if the user is driving or piloting a moving body such as an automobile, a ship, or an airplane, the restriction unit 124 may restrict speed, a moving range, and a driver of the moving body, or may restrict human driving and switch a driving mode to an automatic driving mode. The restriction unit 124 may include a lifting unit, and if the user is restricted by the restriction unit 124 from acting, the lifting unit may lift the restriction according to an instruction of the user or a third party (a certification body designated by a national or local government, a third-party body, an employer of the user, a manufacturer of a certification system, a guardian to the user, or the like). If the restriction is lifted, the restriction unit 124 may store at least one of whether the lifting has been made, a date and time, a place, a lifter, or a reason for the lifting.

Figure 4:
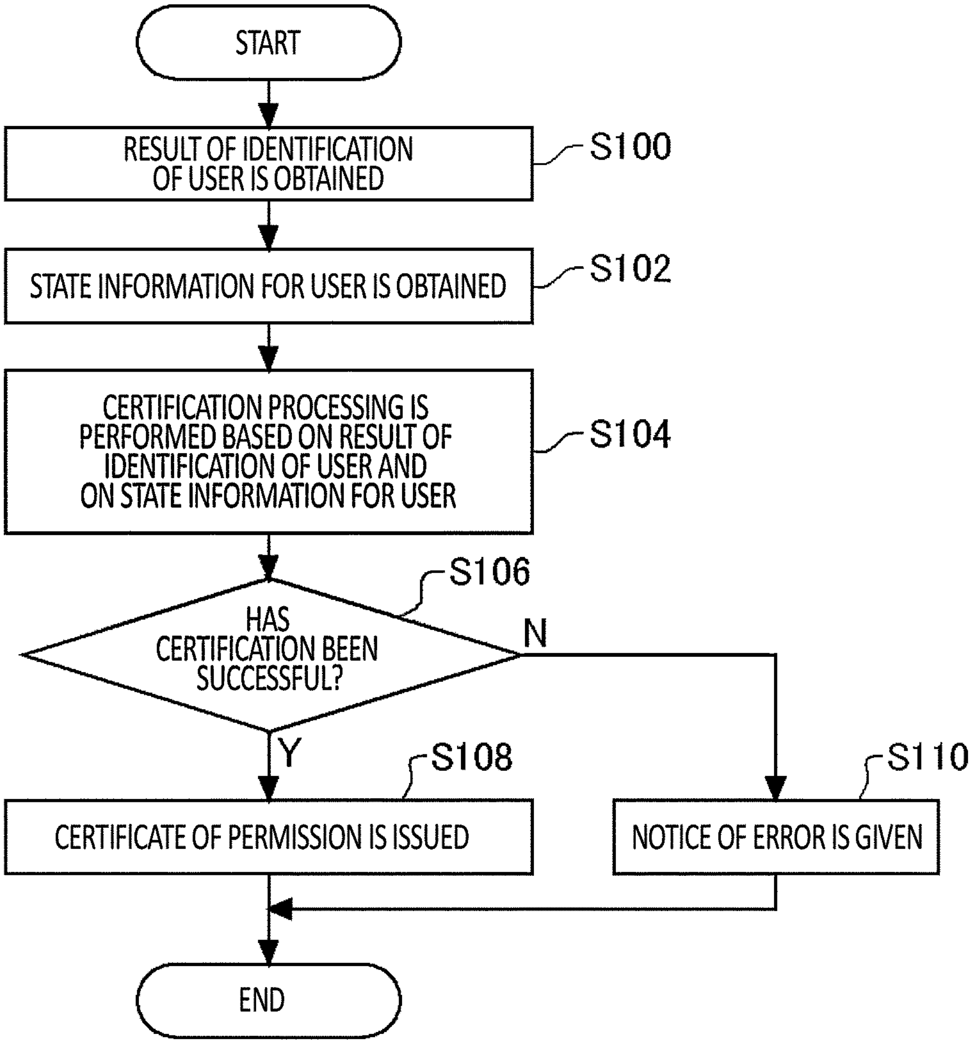
FIG. 4 is a flowchart showing one example of a certification procedure of a certification apparatus.

FIG. 4 is a flowchart showing one example of a certification procedure of a certification apparatus 100.

An obtainment unit 112 obtains a result of identification of a user from a user identification apparatus 30 (S100). Further, the obtainment unit 112 obtains state information for the user from a state detection apparatus 20 (S102). The obtainment unit 112 may obtain information including the result of the identification of the user and the state information for the user from a single apparatus having functions of the state detection apparatus 20 and the user identification apparatus 30.

A certification unit 114 executes certification processing on the user based on the result of the identification of the user and on the state information for the user (S104). The certification unit 114 may compare common information included in the result of the identification of the user with common information included in the state information for the user, thereby determining whether the state detection apparatus 20 and the user identification apparatus 30 are arranged so as to be adjacent to each other to the extent that both identification of the user by the user identification apparatus 30 and detection of the user by the state detection apparatus 20 can be executed on the spot without the user having to move one place to another. If the result of the identification of the user indicates that the user is legitimate, the state information indicates a state of the legitimate user, and the state of the user satisfies a predetermined acceptability condition, the certification unit 114 may certify that the state of the user satisfies a predetermined condition, based on the result of the identification of the user and on the state information for the user.

If the certification unit 114 succeeds in certifying that the state of the user satisfies the predetermined condition, an issuing unit 116 issues a certificate of permission indicating that it has been certified that the state of the user satisfies the predetermined condition (S108). On the other hand, if the certification unit 114 does not succeed in certifying that the state of the user satisfies the predetermined condition, a notification unit 122 gives notice of an error indicating that the user has not been certified (S110).

Figure 5:
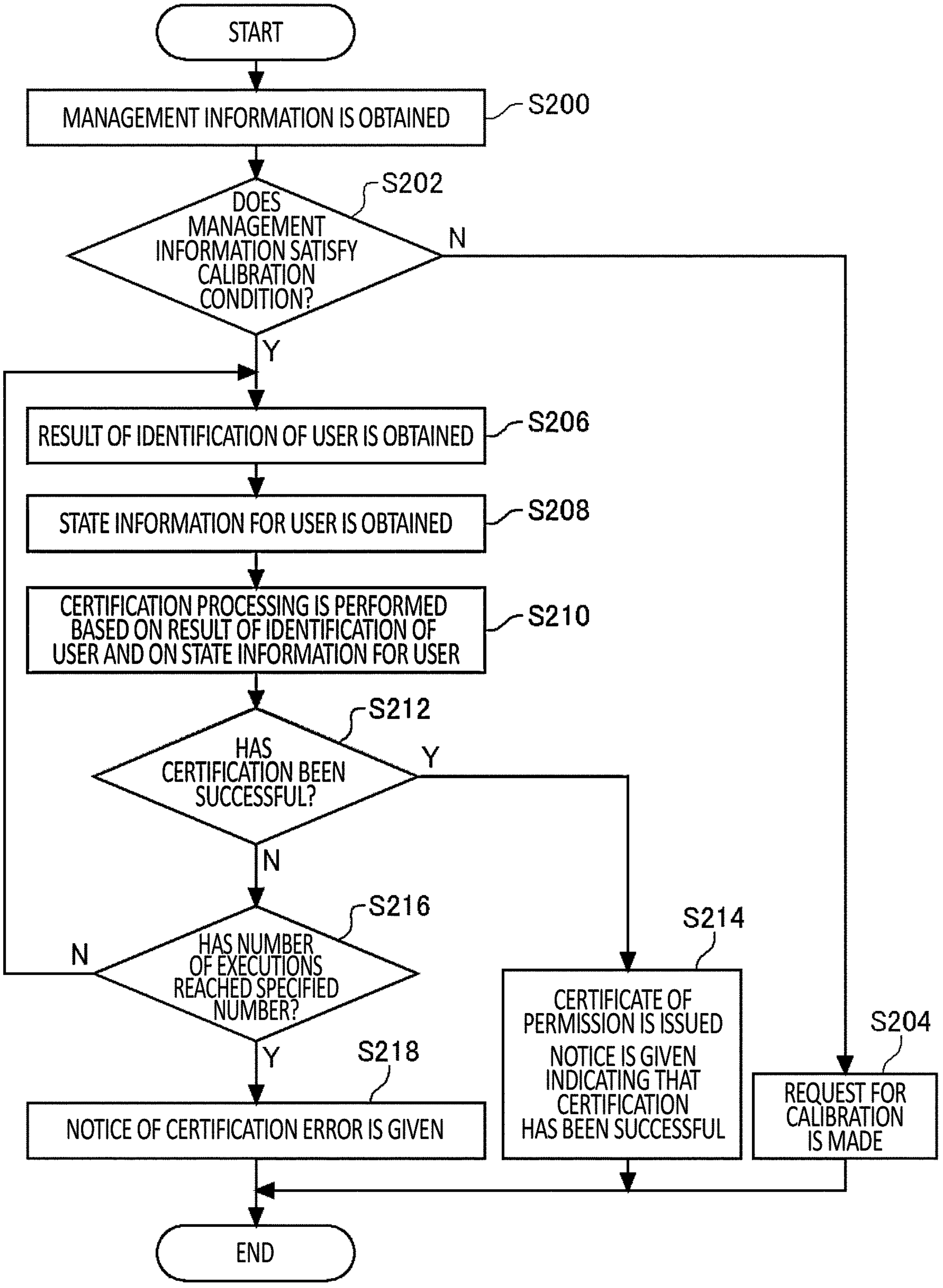
FIG. 5 is a flowchart showing another example of a certification procedure of a certification apparatus.

FIG. 5 is a flowchart showing another example of a certification procedure of a certification apparatus 100.

An obtainment unit 112 obtains management information from a state detection apparatus 20 (S200). A certification unit 114 determines whether information regarding calibration by the state detection apparatus 20 satisfies a predetermined calibration condition, based on information regarding calibration by a calibration unit 24 indicated by the management information (S202). If the information regarding the calibration does not satisfy the predetermined calibration condition, a user is requested to calibrate the state detection apparatus 20 (S204).

If the information regarding the calibration satisfies the predetermined calibration condition, the obtainment unit 112 obtains a result of identification of the user from a user identification apparatus 30 (S206). Further, the obtainment unit 112 obtains state information for the user from the state detection apparatus 20 (S208). The certification unit 114 executes certification processing on the user based on the result of the identification of the user and on the state information for the user (S210).

If the certification unit 114 succeeds in certifying that a state of the user satisfies a predetermined condition, an issuing unit 116 issues a certificate of permission indicating that it has been certified that the state of the user satisfies the predetermined condition (S214).

If the certification unit 114 does not succeed in the certification, it is determined whether the number of times that the certification unit 114 has executed the certification processing has reached a specified number (S216). If the number of times that the certification processing has been executed has not reached the specified number, the certification apparatus 100 repeats processing from the step S206 onwards so that the certification unit 114 executes the certification processing again. If the number of times that the certification processing has been executed has reached the specified number, a notification unit 122 gives notice of an error indicating that the user has not been certified (S218).

As described above, if the issuing unit 116 issues the certificate of permission, the user who has been certified may be permitted to operate a specific apparatus. For example, if it is certified that an examination of a breath alcohol concentration has been conducted on a user without any fraudulence, the user is permitted to drive an automobile.

A certification system 10 according to the present embodiment can prevent fraudulent processing from being performed on the state information indicating a specific state such as a breath state of the user. Therefore, it is also possible to accurately make judgement, which is based on the specific state, as to whether operation of the specific apparatus is to be permitted, or the like.

Figure 6:
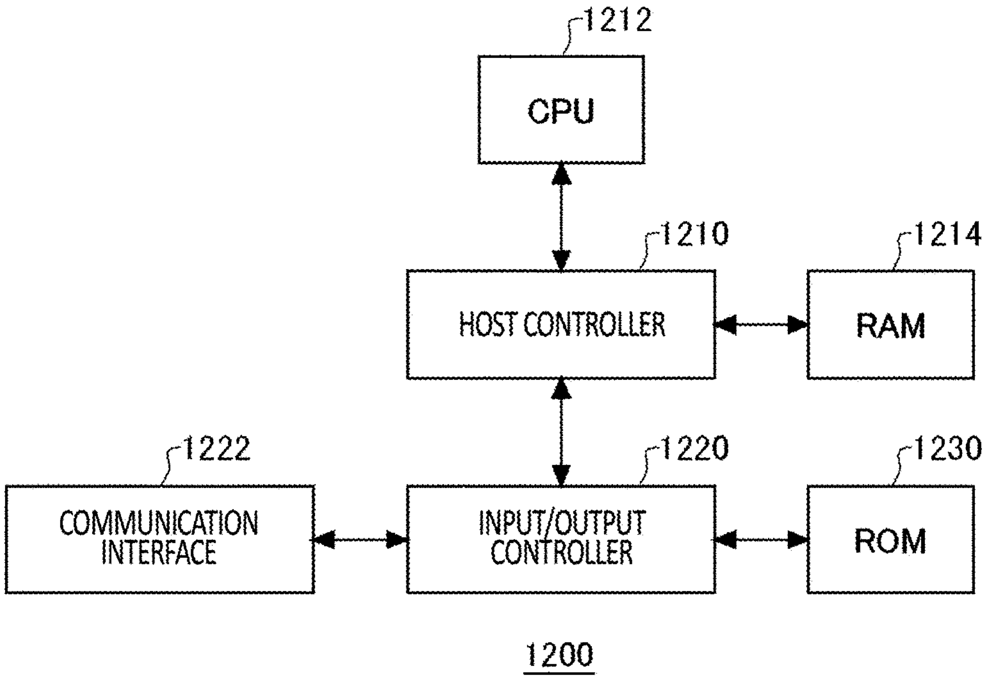
FIG. 6 is one example of a hardware configuration.

FIG. 6 shows one example of a computer 1200 in which a plurality of aspects of the present invention may be entirely or partially embodied. Programs installed in the computer 1200 can cause the computer 1200 to function as operations associated with the apparatus according to the embodiments of the present invention or one or more "units" of the apparatus. Alternatively, the programs can cause the computer 1200 to execute the operations or the one or more "units". The programs can cause the computer 1200 to execute a process according to the embodiments of the present invention or stages of the process. Such programs may be executed by a CPU 1212 in order to cause the computer 1200 to execute specific operations associated with some or all of the blocks in the flowcharts and block diagrams described in the present specification.

The computer 1200 according to the present embodiment includes the CPU 1212 and an RAM 1214, which are mutually connected by a host controller 1210. The computer 1200 also includes a communication interface 1222 and an input/output unit, which are connected to the host controller 1210 via an input/output controller 1220. The computer 1200 also includes an ROM 1230.

The CPU 1212 operates in accordance with the programs stored in the ROM 1230 and the RAM 1214, thereby controlling each unit.

The communication interface 1222 communicates with another electronic device via a network. A hard disk drive may store the programs and data used by the CPU 1212 in the computer 1200. The ROM 1230 stores therein boot programs or the like executed by the computer 1200 at the time of activation, and/or programs depending on hardware of the computer 1200. A program is provided via a computer readable recording medium such as a CD-ROM, a USB memory, or an IC card, or via a network. The programs are installed in the RAM 1214 or the ROM 1230 which is also an example of the computer readable recording medium, and executed by the CPU 1212. Information processing described in these programs is read by the computer 1200, and provides cooperation between the programs and the various types of hardware resources described above. The apparatus or method may be configured by implementing operations or processings of information in accordance with use of the computer 1200.

For example, if a communication is executed between the computer 1200 and an external device, the CPU 1212 may execute a communication program loaded in the RAM 1214 and instruct the communication interface 1222 to perform communication processing based on a process described in the communication program. The communication interface 1222, under the control of the CPU 1212, reads transmission data stored in a transmission buffer region provided in a recording medium such as the RAM 1214 or the USB memory, transmits the read transmission data to the network, or writes reception data received from the network to a reception buffer region or the like provided on the recording medium.

In addition, the CPU 1212 may cause all or necessary portion of a file or a database stored in an external recording medium such as a USB memory, to be read by the RAM 1214, and execute various types of processing on the data on the RAM 1214. Next, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for, out of the plurality of entries, an entry with the attribute value of the first attribute designated that meets a condition, and read the attribute value of the second attribute stored in said entry, thereby obtaining the attribute value of the second attribute associated with the first attribute satisfying a predetermined condition.

The programs or software modules described above may be stored in a computer readable storage medium on or near the computer 1200. In addition, a recording medium such as a hard disk or a RAM provided in a server system connected to a dedicated communication network or the Internet can be used as the computer readable storage medium, so that the programs are provided to the computer 1200 via the network.

Computer readable medium may include any tangible device that can store instructions for execution by a suitable device. As a result, the computer readable medium having instructions stored therein includes an article of manufacture including instructions which may be executed to create means for executing operations designated in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy (registered trademark) disk, a diskette, a hard disk, a random access memory (RAM), a read only memory (ROM), an erasable programmable read only memory (EPROM or a flash memory), an electrically erasable programmable read only memory (EEPROM (registered trademark)), a static random access memory (SRAM), a compact disc read only memory (CD-ROM), a digital versatile disk (DVD), a Blu-ray (registered trademark) disk, a memory stick, an integrated circuit card, and the like.

Computer readable instructions may include either a source code or an object code described in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object-oriented programming language such as Smalltalk (registered trademark), JAVA (registered trademark), C++, etc., and programming languages, such as the "C" programming language or similar programming languages. The computer readable instructions may be provided to a processor or a programmable circuit of a programmable data processing apparatus locally or via a local area network (LAN) or a wide area network (WAN) such as the Internet or the like. The processor or the programmable circuit may execute the computer readable instructions to create means for executing operations designated in the flowcharts or block diagrams.

Here, the computer may be a computer such as a personal computer (PC), a tablet computer, smartphone, a work station, a server computer, or a general purpose computer, or may be a computer system in which a plurality of computers are connected. This kind of computer system in which the plurality of computers are connected is also referred to as a distributed computing system, and is a computer in a broad sense. In a distributed computing system, a plurality of computers collectively execute a program by each of the plurality of computers executing part of the program, and passing data during the execution of the program among the computers as needed.

Examples of the processor include a computer processor, a central processing unit (CPU), a processing unit, a microprocessor, a digital signal processor, a controller, a microcontroller, and the like. The computer may include one processor or a plurality of processors. In a multi-processor system including a plurality of processors, the plurality of processors collectively execute a program by each of the processors executing part of the program, and passing data during the execution of the program among the processors as needed. For example, in execution of multiple tasks, each of the plurality of processors may execute one portion of each task pieces by pieces by performing task-switching for each time slice. In this case, which portion of one program each processor is to execute dynamically changes. In addition, which portion of the program each of the plurality of processors is to execute may be statically determined by multi-processor aware programming.

While the present invention has been described by way of the embodiments, the technical scope of the present invention is not limited to the scope described in the above-described embodiments. It is apparent to persons skilled in the art that various modifications or improvements can be made to the above-described embodiments. It is also apparent from description of the claims that the embodiments to which such modifications or improvements are made may be included in the technical scope of the present invention.

It should be noted that each process of the operations, procedures, steps, stages, and the like performed by the apparatus, system, program, and method shown in the claims, specification, or drawings can be executed in any order as long as the order is not indicated by "prior to", "before", or the like and as long as the output from a previous process is not used in a later process. Even if the operation flow is described using phrases such as "first" or "next" for the sake of convenience in the claims, specification, or drawings, it does not necessarily mean that the process must be performed in this order.

1. A certification system comprising:

an obtainment unit which obtains a result of identification of a user performed based on user information regarding the user and obtains state information indicating a specific state of the user from a state detection apparatus which detects the specific state of the user; and a certification unit which certifies that a state of the user satisfies a predetermined condition, based on the result of the identification of the user and on the state information.

2. The certification system according to claim 1, further comprising an issuing unit which, if the certification unit certifies that the state of the user satisfies the predetermined condition, issues a certificate of permission indicating that it has been certified that the state of the user satisfies the predetermined condition.

3. The certification system according to claim 1, wherein the specific state includes at least one of a state regarding a physical condition of the user, a state regarding an activity of the user, a state regarding work of the user, or a state regarding a capacity of the user.

4. The certification system according to claim 3, wherein the state regarding the physical condition of the user includes at least one of a breath alcohol concentration, a blood alcohol concentration, a body temperature, a heartbeat, a pulse beat, a respiratory rate, a blood pressure, a blood glucose level, coughing, a voice, an eye movement, myoelectricity, a facial expression, staggering, or a stress state.

5. The certification system according to claim 3, wherein the state regarding the activity of the user includes at least one of meal hours, meal contents, an exercise record, sleeping hours, a medication history, a hospital visit history, or a treatment history.

6. The certification system according to claim 3, wherein the state regarding the work of the user includes at least one of working hours, overtime working hours, an amount of time elapsed since an end of last work, or a number of consecutive working days.

7. The certification system according to claim 3, wherein the state regarding the capacity of the user includes at least one of a cognitive capacity or an exercise capacity check test.

8. The certification system according to claim 2, further comprising a provision unit which provides the certificate of permission to an apparatus that the user is permitted to operate based on the certificate of permission.

9. The certification system according to claim 8, further comprising a change detection unit which detects that a user operating the apparatus has been changed, wherein the obtainment unit newly obtains the state information and the result of the identification in response to the change detection unit detecting that the user has been changed, and the certification unit certifies that the state of the user satisfies the predetermined condition, based on the result of the identification newly obtained by the obtainment unit and on the state information newly obtained by the obtainment unit.

10. The certification system according to claim 8, wherein the apparatus is a moving body driven by the user, and if the certificate of permission for the user is provided, the moving body permits the user to drive the moving body.

11. The certification system according to claim 10, further comprising a change detection unit which detects that a driver of the moving body has been changed, wherein the obtainment unit newly obtains the state information and the result of the identification in response to the change detection unit detecting that the driver of the moving body has been changed, and the certification unit certifies that the state of the user satisfies the predetermined condition, based on the result of the identification newly obtained by the obtainment unit and on the state information newly obtained by the obtainment unit.

12. The certification system according to claim 10, wherein the obtainment unit further obtains moving body information regarding the moving body from the moving body, and the certification unit certifies that the state of the user satisfies the predetermined condition, based further on the moving body information.

13. The certification system according to claim 1, wherein the obtainment unit further obtains environmental information indicating a state of an environment around the user, and the certification unit certifies that the state of the user satisfies the predetermined condition, based further on the environmental information.

14. The certification system according to claim 1, wherein the obtainment unit further obtains locational information indicating a location at which the user is present, and the certification unit certifies that the state of the user satisfies the predetermined condition, based further on the locational information.

15. The certification system according to claim 1, further comprising a notification unit which, if the certification unit does not certify that the state of the user satisfies the predetermined condition, gives notice indicating that the user has not been certified.

16. The certification system according to claim 1, wherein the certification unit causes a storage unit to store a certification result.

17. The certification system according to claim 1, wherein the obtainment unit obtains the result of the identification of the user from a user identification apparatus which identifies the user, and the user identification apparatus identifies the user based on at least one of biometric authentication, ID authentication, or password authentication.

18. The certification system according to claim 1, wherein the state detection apparatus has a calibration unit which executes calibration of the state detection apparatus, the obtainment unit obtains management information including at least one of: a calibration time at which calibration is to be executed by the calibration unit; or a calibration date and time, a calibration method, or calibrator information for the calibration of the calibration executed by the calibration unit, and the certification unit certifies that the state of the user satisfies the predetermined condition based further on the management information.

19. The certification system according to claim 18, wherein if the management information satisfies a predetermined calibration condition, the certification unit certifies that the state of the user satisfies the predetermined condition, based on the result of the identification of the user and on the state information.

20. A certification method comprising:

obtaining, by an obtainment unit, a result of identification of a user performed based on user information regarding the user;

obtaining, by the obtainment unit, state information indicating a specific state of the user from a state detection apparatus which detects the specific state of the user; and certifying, by a certification unit, that a state of the user satisfies a predetermined condition, based on the result of the identification of the user and on the state information.

21. A program that causes a computer to function as:

an obtainment unit which obtains a result of identification of a user performed based on user information regarding the user and obtains state information indicating a specific state of the user from a state detection apparatus which detects the specific state of the user; and a certification unit which certifies that a state of the user satisfies a predetermined condition, based on the result of the identification of the user and on the state information.

EXPLANATION OF REFERENCES

10: certification system,
20: state detection apparatus,
22: measurement unit,
24: calibration unit,
26: storage unit,
28: statistics generation unit,
30: user identification apparatus,
32: user information obtainment unit,
34: identification unit,
36: storage unit,
50: network,
80: moving body,
100: certification apparatus,
106: calibration unit,
110: control unit,
112: obtainment unit,
114: certification unit,
116: issuing unit,
118: provision unit,
120: change detection unit,
122: notification unit,
124: restriction unit,
130: storage unit,
200: alcohol detector,
202: wearable terminal,
1200: computer,
1210: host controller,
1212: CPU,
1214: RAM,
1220: input/output controller,
1222: communication interface, and
1230: ROM.

What is claimed is:

1. A certification system comprising:

an obtainment unit which obtains a result of identification of a user performed based on user information regarding the user and state information indicating a specific state of the user detected by a state detection apparatus; and a certification unit which certifies that a state of the user satisfies a predetermined condition including that the state detection apparatus is calibrated and maintained, based on the result of the identification of the user and on the state information, wherein the obtainment unit obtains, from a calibration unit which executes calibration of the state detection apparatus, management information including at least one of: a calibration time at which calibration is to be executed by the calibration unit; whether any calibration has been executed by the calibration unit; a calibration date and time, a calibration method, calibrator information, or a calibration setting; a correction amount or a correction formula for correcting the specific state of the user detected by the state detection apparatus; presence or absence of a failure of the state detection apparatus; a cumulative number of times that the state detection apparatus has been used; an expiration date for use of the state detection apparatus; or a version or update of software of the state detection apparatus, the state detection apparatus includes the calibration unit and a measurement unit, the state detection apparatus is calibrated by the calibration unit using at least one of procedure (a) and procedure (b), procedure (a) comprises:

measuring an indicator of the specific state of the user by the measurement unit to obtain a measured indicator of the specific state of the user;

obtaining a reference indicator measured in advance when the user to be measured is in the specific state; and correcting a coefficient for calculating the measured indicator such that the measured indicator matches the reference indicator, procedure (b) comprises:

using a measurement value from the measurement unit for a period of time during which the indicator of the specific state of the user has not been obtained from the user may be used as a zero point, to automatically perform zero-point calibration of the measurement unit, and the certification unit certifies that the state of the user satisfies the predetermined condition, based further on the management information.

2. The certification system according to claim 1, wherein if the management information does not satisfy the predetermined calibration condition, the certification unit gives notice indicating that the management information does not satisfy the predetermined calibration condition.

3. The certification system according to claim 1, further comprising an issuing unit which, if the certification unit certifies that the state of the user satisfies the predetermined condition, issues a certificate of permission indicating that it has been certified that the state of the user satisfies the predetermined condition.

4. The certification system according to claim 1, wherein the specific state includes at least one of a state regarding a physical condition of the user, a state regarding an activity of the user, a state regarding work of the user, or a state regarding a capacity of the user.

5. The certification system according to claim 4, wherein the state regarding the physical condition of the user includes at least one of a breath alcohol concentration, a blood alcohol concentration, a body temperature, a heartbeat, a pulse beat, a respiratory rate, a blood pressure, a blood glucose level, coughing, a voice, an eye movement, myoelectricity, a facial expression, staggering, or a stress state.

6. The certification system according to claim 4, wherein the state regarding the activity of the user includes at least one of meal hours, meal contents, an exercise record, sleeping hours, a medication history, a hospital visit history, or a treatment history.

7. The certification system according to claim 4, wherein the state regarding the work of the user includes at least one of working hours, overtime working hours, an amount of time elapsed since an end of last work, or a number of consecutive working days.

8. The certification system according to claim 4, wherein the state regarding the capacity of the user includes at least one of a cognitive capacity or an exercise capacity check test.

9. The certification system according to claim 3, further comprising a provision unit which provides the certificate of permission to an apparatus that the user is permitted to operate based on the certificate of permission.

10. The certification system according to claim 9, wherein the obtainment unit newly obtains the state information and the result of the identification in response to detection that a user operating the apparatus has been changed, and the certification unit certifies that the state of the user satisfies the predetermined condition, based on the result of the identification newly obtained by the obtainment unit and on the state information newly obtained by the obtainment unit.

11. The certification system according to claim 9, wherein the apparatus is a moving body driven by the user, and if the certificate of permission for the user is provided, the moving body permits the user to drive the moving body.

12. The certification system according to claim 11, wherein the obtainment unit newly obtains the state information and the result of the identification in response to detection that a driver of the moving body has been changed, and the certification unit certifies that the state of the user satisfies the predetermined condition, based on the result of the identification newly obtained by the obtainment unit and on the state information newly obtained by the obtainment unit.

13. The certification system according to claim 11, wherein the obtainment unit further obtains moving body information regarding the moving body from the moving body, and the certification unit certifies that the state of the user satisfies the predetermined condition, based further on the moving body information.

14. The certification system according to claim 1, wherein the obtainment unit further obtains environmental information indicating a state of an environment around the user, and the certification unit certifies that the state of the user satisfies the predetermined condition, based further on the environmental information.

15. The certification system according to claim 1, wherein the obtainment unit further obtains locational information indicating a location at which the user is present, and the certification unit certifies that the state of the user satisfies the predetermined condition, based further on the locational information.

16. The certification system according to claim 15, wherein the certification unit changes the predetermined condition based on the locational information.

17. The certification system according to claim 1, further comprising a notification unit which, if the certification unit does not certify that the state of the user satisfies the predetermined condition, gives notice indicating that the user has not been certified.

18. The certification system according to claim 1, wherein if the management information satisfies a predetermined calibration condition, the certification unit certifies that the state of the user satisfies the predetermined condition, based on the result of the identification of the user and on the state information.

19. A certification method comprising:

obtaining, by an obtainment unit, a result of identification of a user performed based on user information regarding the user and state information indicating a specific state of the user detected by a state detection apparatus; and certifying, by a certification unit, that a state of the user satisfies a predetermined condition including that the state detection apparatus is calibrated and maintained, based on the result of the identification of the user and on the state information, wherein the obtaining includes obtaining, from a calibration unit which executes calibration of the state detection apparatus, management information including at least one of: a calibration time at which calibration is to be executed by the calibration unit; whether any calibration has been executed by the calibration unit; a calibration date and time, a calibration method, calibrator information, or a calibration setting; a correction amount or a correction formula for correcting the specific state of the user detected by the state detection apparatus; presence or absence of a failure of the state detection apparatus; a cumulative number of times that the state detection apparatus has been used; an expiration date for use of the state detection apparatus; or a version or update of software of the state detection apparatus, the certifying includes certifying that the state of the user satisfies the predetermined condition, based further on the management information, and the state detection apparatus includes the calibration unit and a measurement unit, the state detection apparatus is calibrated by the calibration unit using at least one of procedure (a) and procedure (b), procedure (a) comprises:

measuring an indicator of the specific state of the user by the measurement unit to obtain a measured indicator of the specific state of the user;

obtaining a reference indicator measured in advance when the user to be measured is in the specific state; and correcting a coefficient for calculating the measured indicator such that the measured indicator matches the reference indicator, procedure (b) comprises:

using a measurement value from the measurement unit for a period of time during which the indicator of the specific state of the user has not been obtained from the user may be used as a zero point, to automatically perform zero-point calibration of the measurement unit.

20. A non-transitory computer readable recording medium having stored thereon a program that causes a computer to function as:

an obtainment unit which obtains a result of identification of a user performed based on user information regarding the user and state information indicating a specific state of the user detected by a state detection apparatus; and a certification unit which certifies that a state of the user satisfies a predetermined condition including that the state detection apparatus is calibrated and maintained, based on the result of the identification of the user and on the state information, wherein the obtainment unit obtains, from a calibration unit which executes calibration of the state detection apparatus, management information including at least one of: a calibration time at which calibration is to be executed by the calibration unit; whether any calibration has been executed by the calibration unit; a calibration date and time, a calibration method, calibrator information, or a calibration setting; a correction amount or a correction formula for correcting the specific state of the user detected by the state detection apparatus; presence or absence of a failure of the state detection apparatus; a cumulative number of times that the state detection apparatus has been used; an expiration date for use of the state detection apparatus; or a version or update of software of the state detection apparatus, the certification unit certifies that the state of the user satisfies the predetermined condition, based further on the management information, and the state detection apparatus includes the calibration unit and a measurement unit, the state detection apparatus is calibrated by the calibration unit using at least one of procedure (a) and procedure (b), procedure (a) comprises:

measuring an indicator of the specific state of the user by the measurement unit to obtain a measured indicator of the specific state of the user;

obtaining a reference indicator measured in advance when the user to be measured is in the specific state; and correcting a coefficient for calculating the measured indicator such that the measured indicator matches the reference indicator, procedure (b) comprises:

using a measurement value from the measurement unit for a period of time during which the indicator of the specific state of the user has not been obtained from the user may be used as a zero point, to automatically perform zero-point calibration of the measurement unit.

* * * * *